(12) United States Patent
Shemtov

(10) Patent No.: US 7,793,988 B1
(45) Date of Patent: Sep. 14, 2010

(54) CONNECTOR FOR ELECTRICAL WIRE-CARRYING CONDUITS

(76) Inventor: Sami Shemtov, 3640 Yacht Club Dr. Apt. 2005, Aventura, FL (US) 33180

( * ) Notice: Subject to any disclaimer, the term of this patent is extended or adjusted under 35 U.S.C. 154(b) by 0 days.

(21) Appl. No.: 09/849,635

(22) Filed: May 4, 2001

(51) Int. Cl.
*F16L 3/00* (2006.01)

(52) U.S. Cl. ............... 285/61; 285/404; 248/59

(58) Field of Classification Search ............ 248/58, 248/59, 62, 63; 285/61, 64, 404, 417, 383, 285/907; 174/49, 166 R
See application file for complete search history.

(56) References Cited

U.S. PATENT DOCUMENTS

| | | | | |
|---|---|---|---|---|
| 1,423,309 A * | 7/1922 | Curtis | ................. | 138/106 |
| 2,146,067 A * | 2/1939 | Graham | ................. | 285/133.11 |
| 2,246,557 A * | 6/1941 | Walters | ................. | 285/61 |
| 2,698,760 A * | 1/1955 | Roth et al. | ................. | 137/799 |
| 2,846,169 A * | 8/1958 | Sullivan | ................. | 248/62 |
| 2,916,309 A * | 12/1959 | Wolar | ................. | 285/86 |
| 3,493,206 A * | 2/1970 | Albro | ................. | 248/59 |
| 3,526,934 A * | 9/1970 | Owen, Sr. | ................. | 285/154.1 |
| 3,829,136 A * | 8/1974 | Eidelberg | ................. | 285/383 |
| 3,869,154 A * | 3/1975 | Sanchez | ................. | 285/231 |
| 3,933,377 A * | 1/1976 | Arrowood | ................. | 248/62 |
| 4,107,452 A * | 8/1978 | Razvi | ................. | 285/383 |
| 4,159,859 A * | 7/1979 | Shemtov | ................. | 439/100 |
| 4,418,757 A * | 12/1983 | Merkel | ................. | 169/54 |
| 4,518,177 A * | 5/1985 | Deakins | ................. | 248/62 |
| 4,793,578 A * | 12/1988 | Howard | ................. | 248/62 |

* cited by examiner

*Primary Examiner*—Aaron Dunwoody
(74) *Attorney, Agent, or Firm*—Miskin & Tsui-Yip LLP; Howard C. Miskin, Esq.; Gloria Tsui-Yip, Esq.

(57) ABSTRACT

A coupling device for electrical wire-carrying conduits for assembly with an overhead support member having a stem with a free threaded end. The coupling device includes an integral tubular member having axially opposed ends, each of which receives an end of a mating conduit, and the integral top surface on the tubular member has an aperture for engagement with the free end of the stem of the supporting member.

37 Claims, 2 Drawing Sheets

CONNECTOR FOR ELECTRICAL WIRE-CARRYING CONDUITS

FIELD OF THE INVENTION

This invention relates generally to connectors for conduits such as pipes, tubes and the like, and is particularly related to an improved connector or coupling device for electrical wire-carrying conduits and for securing the connector to a wall or a ceiling.

BACKGROUND OF THE INVENTION

Conduit connectors or couplings are commonly used for coupling conduits such as pipes or ducts which carry electrical transmission wires or cables through the conduits. One such connector is disclosed in U.S. Pat. No. 5,165,735 issued to Nardi et al. on Nov. 24, 1992. This patent describes a conduit coupling device comprising a tubular casing having a radial bore. Housed in the casing is a conduit clamp assembly which includes a pair of interlocking arcuate clamps coaxial with the casing. One of the clamps is fixed in position in the casing while a screw engages the tapped bore and bears on the other clamp. An internally threaded projection extends radially from the casing and engages the clamp bearing screw.

While the conduit connector described in the aforementioned patent is designed to overcome the shortcomings of the coupling devices theretofore known in the prior art, it is somewhat limited in its adaptability and installation.

It is therefore an object of this invention to provide an improved connector for electrical wire-carrying conduits.

It is also an object of this invention to provide a connector for electrical wire-carrying conduits which can be installed and secured to a ceiling while in a suspended state.

It is a further object of this invention to provide such connectors by using readily available components which are easy and convenient to assemble and install.

The foregoing and other objects and features of this invention will be more clearly understood from the following description and the accompanying drawings of the different embodiments of the invention.

SUMMARY OF THE INVENTION

The present invention provides a coupling device for electrical wire-carrying conduits, which allows easy assembly with overhead supporting members. The coupling device comprises a tubular member having opposed axially aligned ends which, according to one embodiment of the invention, is threaded at both ends for engagement with an externally threaded conduit. A pair of aligned stop members projecting from the middle of the inner surface of tubular member fix the position of each conduit and assure the alignments of the respective ends of each conduit in the tubular member. A raised member is formed on an exterior surface of the tubular member, the raised member comprising a top surface which has an internally threaded passage or a bore. A clamp assembly having a threaded stem engages the internally threaded passage and is fixed in position by means of an adjustable lock nut. The clamp assembly carrying the coupling device may be installed to a ceiling or a structure located above the coupling device.

In a different embodiment, the ends of the tubular member are unthreaded, and a pair of adjustable set screws are used in order to prevent misalignment of the electrical wire-carrying conduits in the tubular member. In all other respects, the two embodiments are substantially similar.

BRIEF DESCRIPTION OF THE DRAWINGS

In the drawings, wherein like reference numerals are employed to designate like parts where possible.

DETAILED DESCRIPTION OF THE PREFERRED EMBODIMENTS OF THE INVENTION

Figure 1:
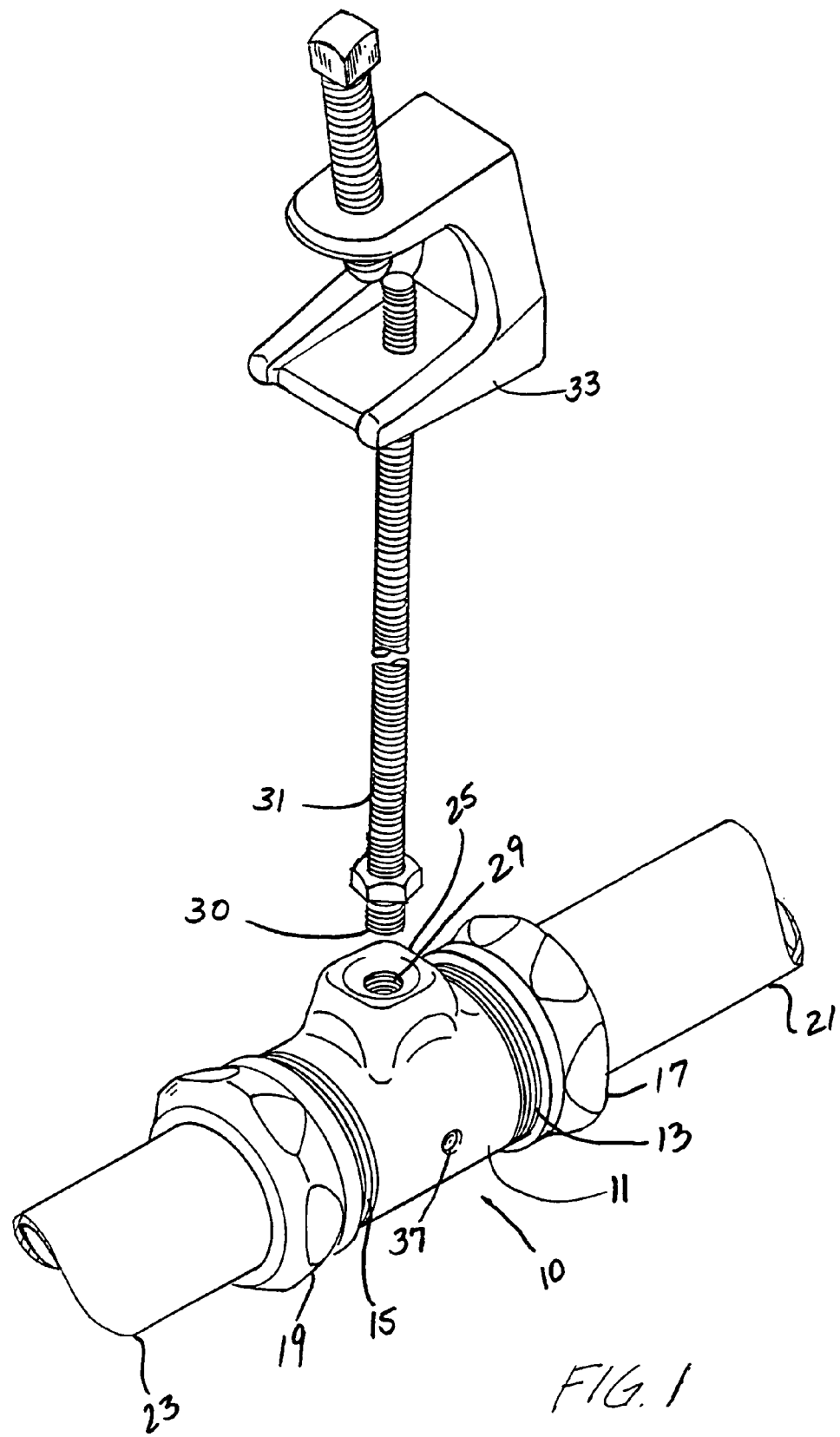
FIG. 1 is a perspective view of the coupling connector of the present invention illustrating the manner of installation thereof to a ceiling by a securing clamp.
Figure 2:
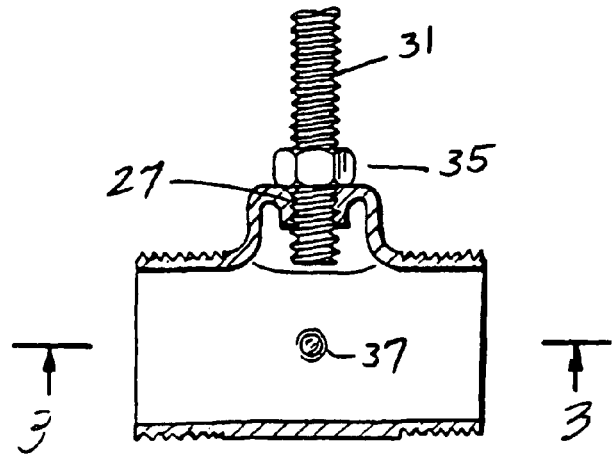
FIG. 2 is a sectional view of the coupling connector shown in FIG. 1.
Figure 3:
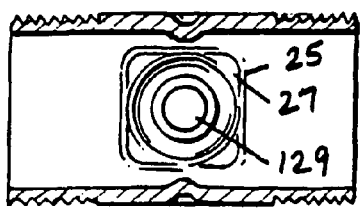
FIG. 3 is a sectional view taken along the line 3-3 in FIG. 2.

Referring to the embodiment of the invention illustrated in FIGS. 1-3, there is shown a coupling device or connector generally designated as 10 comprising a tubular connector or coupling device 11 having externally threaded ends 13 and 15, and a pair of coaxial internally threaded compression lock nuts 17 and 19 adapted to be threadedly engaged onto the respective threaded ends 13 and 15. Conduit or pipe sections 21 and 23 are inserted through the respective lock nuts 17 and 19 and are coaxially aligned through the connector, and a pair of ring washers (not shown), one slipped on each end of the tubular connector 11 serve to securely lock each pipe section at each end of the connector 11. Each ring washer has a slightly larger inside diameter than the outside diameter of each pipe so as to encircle the pipe and, when it is inserted through the lock nut and into the connector, each washer serves to securely lock the respective pipe sections in place without slippage. It must be noted that the provision of a coupling device and the manner of coupling a pipe or a conduit to the connector are generally known in the art so as not require further detailed description herein.

Referring to FIG. 1, there is shown a raised member 25 located on an exterior surface thereof at about the middle of the connector 11, formed integrally with the outer surface of the coupling connector during fabrication of the coupling device. The raised member 25 has a recessed top surface 27 comprising an internally threaded aperture 29 adapted to be threadedly engaged by the threaded stem 31 of a clamp assembly 33 which can be secured quickly and easily to a ceiling beam (not shown) or any other supporting structure above the conduit connector. A lock nut 35 serves to tightly engage the threaded stem 31 into the opening 29 of the raised member 25. Advantageously the end 30 of stem 31 comes to a stop when it abuts the upper surface of conduits or pipes 21 and/or 23. The lock nut 35 then serves to hold stem 31 in fixed position. Since the lock nut is on the outer surface of connector 11, it is readily and easily tightened to lock stem 31 in position relative to connector 11. No internal nut is required as was necessary with prior art device. The connector 11 has two aligned stops 37 projecting internally midway in the connector 11. The stops 37 serve to fix the end position of each of the pipes 21 and 23 when the pipes are inserted through the coupling connector 11. While separate stops 37 are illustrated, if stem 31 is internally positioned within connector 11, it could act as a stop for conduits 21 and 23.

Figure 4:
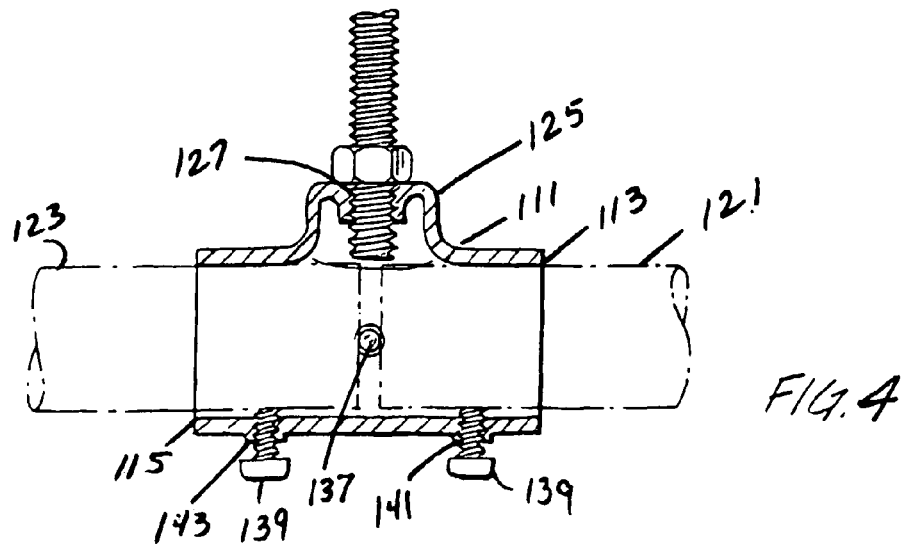
FIG. 4 is a sectional view similar to FIG. 2 but illustrating a coupling connector in accordance with a different embodiment of the present invention.

FIG. 4 illustrates a different embodiment of the invention using a connector 111 which, unlike the connector of FIG. 1, is not threaded at its respective ends 113,115. However, as with the connector shown in FIG. 11, connector 111 is also provided with a raised member 125 having a top recessed surface 127 and comprises a recessed internally threaded aperture 129 for engaging the threaded stem of a clamp assembly similar to that shown in FIG. 1. As in the connector 11 of FIG. 1, a pair of aligned stops 137 project internally midway from the inside surface of the connector for fixing the positions of the ends 113 and 115 of the pipes 121 and 123, respectively, when the pipes are inserted through the connector 111. In order to prevent the pipes 121 and 123 from misalignment and to maintain them at horizontal level, the connector 111 is provided with a pair of spaced apart set screws 139 which are inserted through the apertures 141,143 and are adjustable to press against the outside surface of the pipes 121 and 123 to securely hold the pipes in position and alignment. Thus, in the embodiment shown in FIG. 4, the use of compression fit lock nuts and associated washers are not needed for securing the pipes in aligned positions.

The connector device of the present invention may be conveniently fabricated from stainless steel or other metals, or it may be formed from a suitable rigid or semi-rigid plastic material.

In use, the electrical wire-carrying conduits are coupled together by inserting them through the connector and are securely held in alignment by the compression fit lock nut 17 (as in the embodiment of FIG. 1) or by tightening the set screws 139 (as in the embodiment of FIG. 4). The aligned pipes are then secured to a ceiling or other structure above the pipes by threadedly engaging the threaded stem of the clamp assembly into the internally threaded aperture 29 (FIG. 1) or aperture 129 (FIG. 4) and the stem locked in position by the lock nut 35. If the components are made of a conducting material, this invention provides grounding when fastened to a ceiling structure.

While the present invention has been described with certain degrees of particularity, several changes and modifications may be made therein which are obvious from and are suggested by the foregoing detailed description. For example, the end 30 of stem 31 need not be threaded in which case aperture 29 is also not threaded, and thus the end 30 of stem 31 may be engaged into the aperture 29 and locked in position by the lock nut 35. Other modifications may be made without departing from the scope of this invention.

The invention claimed is:

1. A combination of a coupling member, an electrical wire-carrying conduit, and a connecting member adapted for positioning and securing said conduit to a remote supporting structure having an elongated surface spaced from said coupling member, said combination comprising:
    said electrical wire-carrying conduit having opposite ends;
    said coupling member receiving and supporting said conduit, said coupling member comprises a tubular member having a longitudinal axis and at least one end, said end receiving one end of said conduit along said longitudinal axis, and said tubular member having a wall containing an aperture extending generally perpendicularly to said longitudinal axis of said tubular member; and
    said connecting member having opposite ends, one end of said connecting member securely engaging said aperture in said wall of said tubular member, the opposite end of said connecting member extending outwardly beyond said wall and away from said aperture, and
    a clamp assembly comprising
    i) a clamp body having a generally C-shape configuration and comprising
        (1) a first arm having opposite ends and having a generally smooth, flat surface
        (2) a second arm having opposite ends and spaced from and having a surface generally parallel to said flat surface of said first arm,
        (3) a web connecting one end of said first arm and a corresponding one end of said second arm, and
        (4) each of said first arm and said second arm having threaded apertures extending therethrough, and
    ii) a threaded member threaded through said threaded aperture of said second arm for threaded adjustment,
    iii) said opposite end of said connecting member threaded through said first arm aperture for threaded adjustment of said first and second arms,
said clamp assembly being adapted to be selectively and adjustably connected along said remote supporting structure to permit said connecting member to adjustably and selectively support and position said conduit with respect to said elongated surface of said remote supporting structure and being adapted to selectively and securely engage said remote supporting structure to securely hold and support said coupling member and said conduit in a selected position with respect to said elongated surface of said supporting structure and adapted to be removably engagable to said remote supporting structure.

2. A combination as in claim 1 wherein said wall is raised relative to the exterior surface of said tubular member.

3. A combination as in claim 2 wherein said aperture is threaded internally and said end of said connecting member is externally matingly threaded for engaging into said internally threaded aperture.

4. A combination as in claim 3 further comprising a lock nut along said end of said connecting member for locking said end of said connecting member into said aperture.

5. A combination as in claim 4 wherein said tubular member further having a stop member having a round shape projects internally at about the middle of said tubular member.

6. A combination as in claim 2 wherein said tubular member further having a stop member having a round shape projects internally at about the middle of said tubular member.

7. A combination as in claim 3 wherein said tubular member further having a stop member having a round shape projects internally at about the middle of said tubular member.

8. A combination as in claim 1 wherein said aperture is threaded internally and said end of said connecting member is externally matingly threaded for engaging into said internally threaded aperture.

9. A combination as in claim 8 further comprising a lock nut along said end of said connecting member for locking said end of said connecting member into said aperture.

10. A combination as in claim 9 wherein said tubular member further having a stop member having a round shape projects internally at about the middle of said tubular member.

11. A combination as in claim 8 wherein said tubular member further having a stop member having a round shape projects internally at about the middle of said tubular member.

12. A combination as in claim 1 further comprising a lock nut along said end of said connecting member for locking said end of said connecting member into said aperture.

13. A combination as in claim 12 wherein said tubular member further having a stop member having a round shape projects internally at about the middle of said tubular member.

14. A combination as in claim 2 further comprising a lock nut along said end of said connecting member for locking said end of said connecting member into said aperture.

15. A combination as in claim 14 wherein said tubular member further having a stop member having a round shape projects internally at about the middle of said tubular member.

16. A combination as in claim 1 wherein said tubular member further having a stop member having a round shape projects internally at about the middle of said tubular member.

17. A combination as in claim 1 wherein said aperture is threaded internally and said end of said connecting member is externally matingly threaded for engaging into said internally threaded aperture.

18. A combination as in claim 17 further comprising a lock nut along said end of said connecting member for locking said end of said connecting member into said aperture.

19. A combination as in claim 18 wherein said tubular member further having a stop member having a round shape projects internally at about the middle of said tubular member.

20. A combination as in claim 17 wherein said tubular member further having a stop member having a round shape projects internally at about the middle of said tubular member.

21. The combination of claim 1, wherein said end of said connecting member is positioned within the confine of said tubular member in direct contact with said conduit.

22. The combination of claim 1, wherein each of said ends of said tubular member is externally threaded for receiving said conduit.

23. The combination of claim 1, wherein each of said ends of said tubular member further having an opening through said tubular member, said opening is internally threaded to receive a set screw for securely positioning said conduit.

24. The combination of claim 1 wherein said tubular member further having a wall surrounding an interior space, wherein said aperture receiving said end of said connecting member within said interior space.

25. The combination of claim 1 wherein said conduit further having a longitudinal axis coaxially aligned with said longitudinal axis of said tubular member.

26. In combination, a remote supporting structure and a device depending from said remote support structure for selectively positioning at least one conduit in depending relationship with respect to said remote supporting structure, said device comprising, in combination, an electrical wire-carrying conduit, having a first and second opposite ends, a coupling member receiving one end of said conduit, a connecting member, and a clamp assembly selectively positioning and adjustably securing along said conduit with respect to the remote supporting structure having an elongated surface generally parallel to the conduit wherein, b) said electrical wire-carrying conduit has opposite ends,
i) each of said ends having a longitudinal axis, and
ii) said conduit having a longitudinal axis coaxially aligned with the longitudinal axis of at least one end;

c) said coupling member comprising a tubular member having at least one end and having a wall containing an aperture facing the remote supporting structure above said coupling member,
i) said aperture being threaded internally,
ii) said at least one end of said tubular member having a longitudinal axis and receiving one end of said conduit and
iii) said longitudinal axis of said one end of said conduit being coaxial with respect to said longitudinal axis of said tubular member;

d) said connecting member having opposite ends,
i) one end of said connecting member being externally matingly threaded for securely engaging into said internally threaded aperture of said tubular member,
ii) the opposite end of said connecting member extending outwardly beyond said wall of said tubular member and toward said remote supporting structure from which said device depends; and e) said clamp assembly comprising
i) a clamp body having a generally C-shape configuration and comprising
(1) a first arm having opposite ends and having a generally smooth, flat surface
(2) a second arm having opposite ends and spaced from and having a surface generally parallel to said flat surface of said first arm,
(3) a web connecting one end of said first arm and a corresponding one end of said second arm, and
(4) each of said first arm and said second arm having threaded apertures extending therethrough, and
ii) a threaded member threaded through said threaded aperture of said second arm for threaded adjustment,
iii) said opposite end of said connecting member threaded through said first arm aperture for threaded adjustment of said first and second arms, said clamp assembly being selectively and adjustably connected along said remote supporting structure to permit said connecting member to adjustably and selectively support and position said conduit with respect to said elongated surface of said remote supporting structure and being adapted to selectively and securely engage said remote supporting structure to securely hold and support said coupling member and said conduit in a selected position with respect to said elongated surface of said supporting structure and to be removably engagable to said remote supporting structure.

27. A combination as in claim 26 wherein said wall is raised relative to the exterior surface of said tubular member.

28. A combination as in claim 27 further comprising a lock nut along said end of said connecting member for locking said end of said connecting member into said aperture.

29. A combination as in claim 28 wherein said tubular member further having a stop member having a round shape projects internally at about the middle of said tubular member.

30. A combination as in claim 27 wherein said tubular member further having a stop member having a round shape projects internally at about the middle of said tubular member.

31. A combination as in claim 26 further comprising a lock nut along said end of said connecting member for locking said end of said connecting member into said aperture.

32. A combination as in claim 31 wherein said tubular member further having a stop member having a round shape projects internally at about the middle of said tubular member.

33. A combination as in claim 26 wherein said tubular member further having a stop member having a round shape projects internally at about the middle of said tubular member.

34. The combination of claim 26, wherein said end of said connecting member is positioned within the confine of said tubular member in direct contact with said conduit.

35. The combination of claim 26, wherein each of said ends of said tubular member is externally threaded for receiving said conduit.

36. The combination of claim 26, wherein each of said ends of said tubular member further having an opening through said tubular member, said opening is internally threaded to receive a set screw for securely positioning said conduit.

37. The combination of claim 26, wherein said aperture is generally perpendicular to said longitudinal axis of said tubular member.

* * * * *